Nov. 30, 1948.   R. W. HYDE   2,454,875
SOLDERING IRON
Filed Nov. 9, 1945
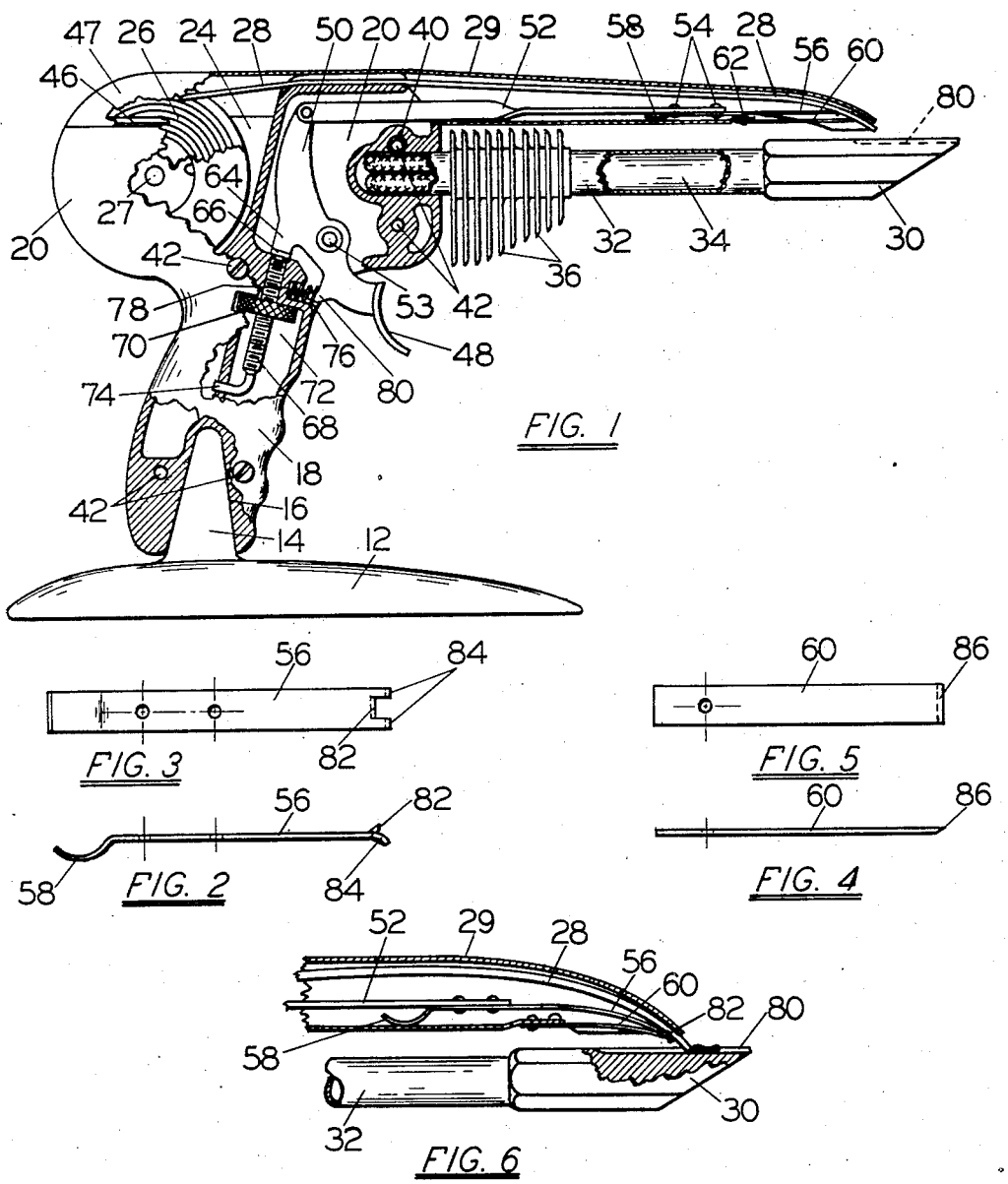
ROBERT W. HYDE
INVENTOR.
BY Donald T. Hillier
ATTORNEY Patented Nov. 30, 1948

2,454,875

UNITED STATES PATENT OFFICE 2,454,875

SOLDERING IRON

Robert W. Hyde, Englewood, N. J.

Application November 9, 1945, Serial No. 627,596

5 Claims. (Cl. 113—105)

My invention relates to improvements in soldering irons, and more particularly to that class of irons which comprise a built-in supply of solder, together with means under the control of an operator for selectively progressively feeding the solder to the tip of the iron where it is melted, whereupon it may be applied to the work pieces in the usual manner.

Irons of the type just described are known to the prior art but they have never become widely adopted, principally for the reason that all previously known irons provide only means for advancing the solder toward the tip of the iron. After the required amount of solder has been melted, the foremost end of the solid solder remains very close to the iron and, consequently, continues to be melted, thus providing more melted solder than is desired, and frequently rendering the use of the iron impractical.

It is a principal object of my invention disclosed herein to provide, in such an iron, means whereby the solder will be retracted from the heated tip, after the desired amount has been melted, so that not more solder will be melted than is desired.

It is another object of my invention to provide a novel base having a means thereon adapted to coact with means forming a part of the iron, whereby the iron may be readily rested upon the base, when not in use, and easily grasped when ready for later use.

It is a general object of my invention to improve soldering irons of the type mentioned above.

In order that the preferred embodiment of my invention may be easily understood, reference is made to the accompanying drawings, wherein Fig. 1 is a side view of my improved soldering iron, certain parts thereof being shown in cross section, and showing the feeding and locking fingers in their retracted positions.

Figs. 2 and 3 are a side and top view of the retractible resilient feeding finger.

Figs. 4 and 5 are a side and top view of the resilient locking finger.

Fig. 6 is an enlarged view of the tip of the iron and showing the locking finger, feed finger and solder in their foremost positions.

Reference is now made to Fig. 1 where a base or stand 12 is shown, having integral therewith the extension 14 which is adapted to fit into the cavity 16 in the lower end of the handle 18 of the iron. The rear housing 20 may be integral with the handle 18, and for ease in construction, assembly, and repair, the handle 18 and housing 20 may comprise two oppositely disposed complementary shaped members.

The housing members 20 are preferably shaped to form a cavity 24 in which a loaded solder reel 26 may be placed. The solder reel 26 may have formed therewith on each side a projection 27, each of which may be held in a pocket (not shown) formed in each of the housing members 20. Solder round or square in cross section may be used. The unrolled end of the solder 28 passes through the tubular feed housing 29 so that when advanced in a manner to be later described it contacts the iron tip 30 which is suitably held by the tube 32 in which is placed the heating element. The heating element may be of any conventional type. Integral with the tube 32 are the cooling fins 36. The tube 32 may have an integral curled lip 40 through which the pin 42 may pass to lock the tube in position as well as to assist in holding the housing members 20 together.

The feed housing 29 may be provided on each side with an integral flange (not shown) which slides into place in the grooves 46 on each side of the housing 20. A reel cap 47 is also provided, and integrally formed with the cap on each side is a flange (not shown) which slides into place in the grooves 46 and abuts against the feed housing 29.

It will be seen that a trigger 48 is integral with the lower end of the lever 50 which is pivotally mounted upon the transverse pin 53 which may also be used to hold the handle and housing members together. Pivotally attached to the upper end of lever 50 is the rear end of the retractible arm 52, shaped as shown, and affixed to the forward end of this arm by means of rivets 54 is the resilient retractible feeding member 56, shown in the retracted position. The rear end of the feed finger 56 is in the form of a spring 58 which forces the forward end of the feed finger upwardly to grip the solder 28. As best seen in Figs. 2 and 3, the forward end of the feed finger 56 has a chisel-like upwardly slanting projection 82 between the two guide prongs 84 which slant downwardly.

Also seen in Fig. 1 is the resilient locking finger 60 which has its rear end affixed to the housing 29 by means of rivet 62. The forward end 86 of the locking finger 60 is also chisel-like, being formed as shown, the upper forward edge being beyond the lower forward edge.

Integral with the lever 50 is the projection 64 which may be flanged at 66 to engage the top end of the feed adjusting screw 68 which coacts with the adjusting nut 70 which is rotatable within the recess 72 formed by the handles 18. This adjusting nut may project through a slot in each side of the handle 18 so that it may be easily rotated by the thumb without releasing the iron. The extension 74 of screw 68 prevents rotation of screw 68 when nut 70 is rotated to adjust the vertical position of screw 68. A spring 76 is held in the recess 78 between the handles 18 by the projection 80, also integral with lever 50.

In the operation of my invention, whenever the operator desires to move the solder 28 into engagement with the heated iron tip, he merely presses his finger against the trigger 48 and the lever 50 is rotated, forcing the feed arm 52 and feed finger 56 ahead, the spring 58 forcing the fore end of the feed finger 56 upwardly so that the upward projection 82 digs into the solder 28, causing the solder to move toward the iron tip 30, and the reel 26 to unwind accordingly. Each of the projections 84 lies on a different side of the solder 28. It should be noted that the locking member 60 does not retard the forward movement of the solder. As the feed finger 56 moves ahead, its foremost end is bent downwardly, as shown in Fig. 6, and it passes between the solder 28 and locking finger 60, also forcing the locking finger 60 downwardly, as shown. The resilient locking member 60 aids in keeping the tip 82 of the member 56 in the solder. The end of the solder 28 engages the iron tip 30, is melted, and runs down the slot 80 in the tip to the work pieces. It will be noted in Fig. 6 that the forward tip of the feed finger 56 is at a distance from the iron tip 30, so as to leave a short distance of unmelted solder below the forward tip of the feed finger.

As the operator releases the trigger 48, the spring 76 forces the upper end of the lever 50 to the rear of the device, and the feed arm 54 and feed finger 56 move in the same direction, locking finger 60 maintaining the tip 82 of the finger in engagement with the solder 28. The solder is accordingly retracted from the iron tip 30 until the tip 82 of the feed finger 56 clears the tip 86 of the locking finger 60, at which instant the tip 86 of the locking finger 60 grips the unmelted length of solder 28 projecting beyond the tip 82 of the feed finger, and prevents further retraction of the solder. The tip 82 of the feed finger 56 then becomes disengaged from the solder and slides along the solder away from the locking finger 60 until the projection 66 of lever 50 engages the top of screw 68. During the return stroke, the solder loosens somewhat on the reel, and also rotates the reel somewhat.

Accordingly, it will be appreciated that when the trigger 48 is released, the solder 28 is retracted from the tip 30 so that during periods when the iron is not in use the heat from the tip will not melt the solder.

The operation may be repeated at any time, and in the event it is desired to melt a considerable length of the solder 28, it is merely necessary to successively actuate and release the trigger 48 until the required amount of solder has been melted.

It will be noted that by means of the adjusting nut 70, the length of the return stroke of the retractible arm 52 and feed finger 56 may be regulated, so that the forward movement of the solder 28 in response to a single pressing of trigger 48 may be varied. Accordingly, the amount of solder melted in response to each actuation of the trigger 48 may be selectively determined.

It will be appreciated by those skilled in the art that many changes may be made from the disclosed embodiment of my invention without departing from the substance thereof. All such changes are intended to be covered by the following claims.

I claim:

1. In a soldering iron of the type having a strip of solder arranged to be successively advanced and retracted with respect to the iron tip, the combination of a first retractible member arranged to engage the solder to advance and retract the same, and a locking member arranged to engage the solder to prevent retraction of the solder when engaged therewith, said retractible member being arranged to disengage the locking member from the solder during the first phase of its retracting movement whereby solder is released from the locking member for retraction.

2. In a soldering iron of the type having a strip of solder arranged to be successively moved into engagement with the heated tip of the iron and retracted therefrom, a retractible member arranged to engage the solder to advance and normally retract the solder depending upon its direction of motion, a locking member arranged to engage the solder to prevent retraction of the solder when engaged therewith, and manually controllable means connected to said retractible member for advancing and retracting said retractible member to advance and retract the solder, said members being so arranged that during the first part of the retracting stroke the locking member is disengaged from the solder, and during the latter part of the same stroke the locking member engages the solder to prevent the retractible member from further retracting the solder.

3. In a soldering iron of the type having solder arranged to be successively advanced to engage the iron tip and retracted therefrom, the combination of a locking member for engaging the solder to prevent retraction of the solder when engaged therewith, a manually controllable retractible member for engaging the solder to advance and retract the same, said retractible member also being arranged to disengage the locking member from the solder during a portion only of its retracting stroke so that the solder is retracted by the retractible member during the said portion of its stroke.

4. In a soldering iron of the type having a strip of solder arranged to be successively advanced to engage the iron tip and retracted therefrom, the combination of a locking member having a tip for digging into the side of the strip of solder to prevent retraction of the solder when embedded therein, a retractible member having a tip for digging into the same side of the solder to normally move the same therewith, said retractible member being arranged to pass between said locking member and the solder to displace the locking member from the solder during a portion only of the advance and retracting strokes of the retractible member, and said locking member being arranged to retain the tip of the retracting member in the solder during the same portion of the advance and retracting strokes of the retractible member.

5. In a soldering iron of the type having a strip of solder arranged to be successively moved into engagement with the heated tip of the iron and retracted therefrom, a retractible member arranged to engage the solder to advance and normally retract the solder depending upon its direction of motion, a fixed locking member arranged to engage the solder to prevent retraction of the solder when engaged therewith, manually controllable means connected to said retractible member for advancing and retracting said retractible member to advance and retract the solder, said members being so arranged that during the first part of the retracting stroke the locking member is disengaged from the solder, and during the latter part of the same stroke the locking member engages the solder to prevent the retractible member from further retracting the solder, and means for adjusting the stroke of the retractible member.

ROBERT W. HYDE.

REFERENCES CITED

The following references are of record in the file of this patent:

UNITED STATES PATENTS

| Number | Name | Date |
| --- | --- | --- |
| 2,119,462 | Kull et al. | May 31, 1938 |
| 2,119,995 | Mancinelli | June 7, 1938 |
| 2,251,557 | L. A. Weston | Aug. 5, 1941 |
| 2,396,799 | McCully | Mar. 19, 1946 |